United States Patent
Liao et al.

(10) Patent No.: US 11,487,014 B2
(45) Date of Patent: Nov. 1, 2022

(54) INTEGRATED DEVICE FOR LASER RANGING AND IMAGING

(71) Applicant: NATIONAL APPLIED RESEARCH LABORATORIES, Taipei (TW)

(72) Inventors: Tai-Shan Liao, Hsinchu (TW); Long-Jeng Lee, Hsinchu (TW); Shih-Jie Chou, Hsinchu (TW); Chun-Jen Weng, Hsinchu (TW)

(73) Assignee: NATIONAL APPLIED RESEARCH LABORATORIES, Taipei (TW)

( * ) Notice: Subject to any disclaimer, the term of this patent is extended or adjusted under 35 U.S.C. 154(b) by 478 days.

(21) Appl. No.: 16/830,538

(22) Filed: Mar. 26, 2020

(65) Prior Publication Data
US 2021/0096256 A1   Apr. 1, 2021

(30) Foreign Application Priority Data

Sep. 27, 2019   (TW) ................................. 108135157

(51) Int. Cl.
*G01S 17/89*   (2020.01)
*G01S 7/48*    (2006.01)
*G01S 7/481*   (2006.01)

(52) U.S. Cl.
CPC ............ *G01S 17/89* (2013.01); *G01S 7/4818* (2013.01)

(58) Field of Classification Search
None
See application file for complete search history.

(56) References Cited

U.S. PATENT DOCUMENTS 4,572,949 A * 2/1986 Bowers .................. G01D 5/268
356/482
6,086,205 A * 7/2000 Svetliza ................ A61B 3/1241
351/221

(Continued)

FOREIGN PATENT DOCUMENTS

CN   104849718 B   2/2017
TW      523635 B   3/2003

(Continued)

OTHER PUBLICATIONS

Tai-Shan Liao et al., "The study of laser rangefinder with dual branch flexible light guide"; SPIE Conference; Proc. of SPIE vol. 11123 111230M-1; Sep. 9, 2019; pp. 1-8.

*Primary Examiner* — Tapas Mazumder
(74) *Attorney, Agent, or Firm* — Muncy, Geissler, Olds & Lowe, P.C.

(57) ABSTRACT

An integrated device includes a laser ranging module, a dual-branched fiber bundle, a beam splitter, and an image receiving module. The laser ranging module includes a light source, an optical receiver and a computing unit. The fiber bundle is disposed between the laser ranging module and the beam splitter. A target reflects a measuring beam emitted by the light source to form a reflected beam. The beam splitter splits the reflected beam into a first reflected beam and a second reflected beam. The first reflected beam is transmitted to the optical receiver through the fiber bundle to generate a measurement signal. The computing unit receives the measurement signal to calculate a distance between the target and the fiber bundle. The image receiving module is disposed on the optical path of the second reflected beam to receive the second reflected beam and displays the image of the target.

10 Claims, 3 Drawing Sheets

(56) References Cited

U.S. PATENT DOCUMENTS

| | | | |
|---|---|---|---|
| 7,177,015 B2 | 2/2007 | Ohtomo et al. | |
| 10,323,963 B2 | 6/2019 | Liao et al. | |
| 2018/0270474 A1* | 9/2018 | Liu | A61B 6/508 |

FOREIGN PATENT DOCUMENTS

| | | |
|---|---|---|
| TW | I534450 B | 5/2016 |
| TW | I595252 B | 8/2017 |

* cited by examiner

INTEGRATED DEVICE FOR LASER RANGING AND IMAGING

CROSS REFERENCE TO RELATED APPLICATIONS

This Non-provisional application claims priority under 35 U.S.C. § 119(a) on Patent Application No(s). 108135157 filed in Taiwan, Republic of China on Sep. 27, 2019, the entire contents of which are hereby incorporated by reference.

BACKGROUND

Technology Field

The present disclosure relates to an integrated device for laser ranging and imaging and, in particular, to an integrated device having a ranging function and an image displaying function.

Description of Related Art

In the conventional laser ranging device, a laser beam is emitted to a target, and then an optoelectronic component receive the reflected laser beam from the target. Afterwards, a computing unit determines the total time period from the time point of emitting the laser beam to the time point of receiving the reflected laser beam, thereby calculating the distance between the ranging device and the target. In general, the conventional laser ranging device cannot display the image of the target while performing the distance ranging.

Besides, the conventional laser ranging device can only measure the distance in the direction of the front of the light-emitting module. When the detecting environment is inside a machine or a pipeline, the laser beam emitted by the light-emitting module cannot change direction arbitrarily, resulting in the difficult of ranging operation.

Therefore, it is desired to provide a ranging device that can be applied to various detecting environments without difficulty and simultaneously provide the image of the target.

SUMMARY

To achieve the objective, this disclosure provides an integrated device for laser ranging and imaging, which is configured to measure a distance between the integrated device and a target and to display an image of the target. The integrated device comprises a laser ranging module, a dual-branched fiber bundle, a beam splitter, and an image receiving module. The laser ranging module comprises a light source, an optical receiver and a computing unit. The light source is configured to provide a measuring beam. The optical receiver receives a reflected beam from the target to generate a measurement signal, wherein the measuring beam is emitted from the light source to the target, and the target reflects the measuring beam to form the reflected beam. The computing unit receives the measurement signal. The dual-branched fiber bundle is connected to the laser ranging module. The beam splitter is disposed at one side of the dual-branched fiber bundle away from the laser ranging module. The beam splitter splits the reflected beam into a first reflected beam and a second reflected beam, and a first angle is defined between traveling directions of the first reflected beam and the second reflected beam. The image receiving module is disposed on an optical path of the second reflected beam to receive an image of the target. The measuring beam is emitted from the light source to the target through the dual-branched fiber bundle and the beam splitter. The target reflects the measuring beam to form the reflected beam. The beam splitter splits the reflected beam into the first reflected beam and the second reflected beam. The first reflected beam is transmitted to the optical receiver through the dual-branched fiber bundle to generate the measurement signal. The computing unit receives the measurement signal to calculate a distance between the target and the side of the dual-branched fiber bundle away from the laser ranging module. The image receiving module receives the second reflected beam and displays the image of the target.

In one embodiment, the integrated device further comprises a light absorbing module. The beam splitter splits the measuring beam into a first measuring beam and a second measuring beam, and a second angle is defined between traveling directions of the first measuring beam and the second measuring beam. The light absorbing module is disposed on the traveling direction of the second measuring beam for absorbing the second measuring beam.

In one embodiment, the laser ranging module further comprises a light output port and a light input port, the light output port is disposed corresponding to the light source, the light input port is disposed corresponding to the optical receiver, the measuring beam is emitted from the light output port to the target, and the first reflected beam is emitted from the light input port to the optical receiver.

In one embodiment, the dual-branched fiber bundle comprises a first fiber bundle, a second fiber bundle and a fiber detecting head. The first fiber bundle has an end connecting to the light output port, and the second fiber bundle has an end connecting to the light input port. The fiber detecting head is formed by integrating another end of the first fiber bundle and another end of the second fiber bundle. The measuring beam emitted by the light source passes through the light output port and the first fiber bundle and is then emitted from the fiber detecting head to the target through the beam splitter. The reflected beam is reflected from the target to the beam splitter, and the first reflected beam is transmitted to the optical receiver through the fiber detecting head, the second fiber bundle and the light input port. The optical receiver generates the measurement signal, and the computing unit receives the measurement signal to calculate the distance between the target and an end surface of the fiber detecting head.

In one embodiment, the beam splitter is a 45-degree semitransparent beam-splitter mirror, and the first angle and the second angle are 90 degrees.

In one embodiment, the beam splitter splits the reflected beam into the first reflected beam and the second reflected beam in different proportions.

In one embodiment, the beam splitter splits the measuring beam into the first measuring beam and the second measuring beam in different proportions.

In one embodiment, the light absorbing module comprises a light absorbing material, and the light absorbing material comprises black nanoparticles.

In one embodiment, the light absorbing module further comprises a carrier, and the light absorbing material is disposed on a surface of the carrier.

In one embodiment, the integrated device further comprises a housing, which has a first opening and a second opening. The second opening is disposed corresponding to the first opening. The housing covers one end of the fiber detecting head away from the laser ranging module through the first opening. The beam splitter, the image receiving module and the light absorbing module are disposed inside the housing. The measuring beam is emitted from the light source to the target through the fiber detecting head, the beam splitter, and the second opening. The reflected beam is reflected from the target to the beam splitter through the second opening.

As mentioned above, the integrated device for laser ranging and imaging of this disclosure comprises a beam splitter, which can splits the reflected beam into two reflected beams for ranging and displaying image. Besides, since the dual-branched fiber bundle is configured corresponding to the light source and the optical receiver of the laser ranging module, the light path can be adjusted by arbitrarily curving the fiber while utilizing the integrated device to detecting. This configuration allows the integrated device of this disclosure to adapt various unfriendly detection environments, thereby decreasing the difficulty of ranging operation. In addition, the minimum distance between the target and the integrated device for laser ranging and imaging of this disclosure is not limited, so the integrated device of this disclosure can be applied to measure a shorter distance.

BRIEF DESCRIPTION OF THE DRAWINGS

The disclosure will become more fully understood from the detailed description and accompanying drawings, which are given for illustration only, and thus are not limitative of the present disclosure, and wherein.

DETAILED DESCRIPTION OF THE DISCLOSURE

The present disclosure will be apparent from the following detailed description, which proceeds with reference to the accompanying drawings, wherein the same references relate to the same elements.

Figure 1:
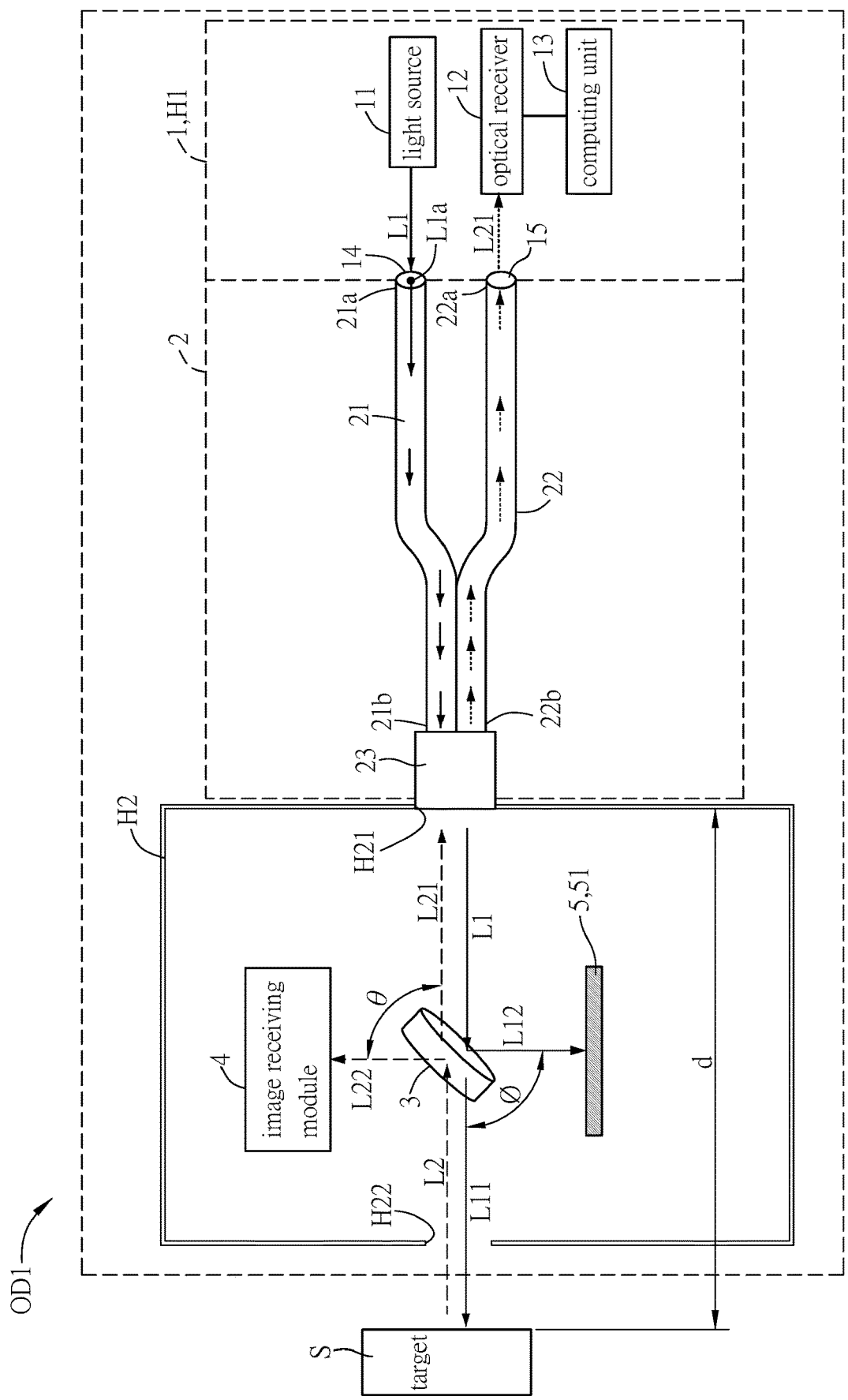
FIG. 1 is a schematic diagram showing an integrated device for laser ranging and imaging according to a first embodiment of this disclosure.

The basic structure and features of an integrated device for laser ranging and imaging according to a first embodiment of this disclosure will be described hereinafter with reference to FIG. 1. FIG. 1 is a schematic diagram showing an integrated device for laser ranging and imaging according to a first embodiment of this disclosure. In order to clearly show the light paths, the measuring beam L1, the first measuring beam L11, and the second measuring beam L12 are shown by solid lines, and the reflected beam L2, the first reflected beam L21, and the second reflected beam L22 are shown by dotted lines. To be noted, the spaces between the beams are shown by the emphasized size in the figure, and these spaces do not reflect the real sizes. In addition, the first reflected beam L21 inside the first fiber bundle is not shown for the purpose of clean and easy illustration. In fact, the reflected beam L2 is reflected from the target S to the fiber detecting head 23 through the beam splitter 3, and then enters the first fiber bundle 21 and the second fiber bundle 22 through the fiber detecting head 23.

The first embodiment of this disclosure provides an integrated device for laser ranging and imaging OD1, which is configured to measure a distance between the integrated device OD1 and a target S and to display an image of the target S. The integrated device OD1 comprises a laser ranging module 1, a dual-branched fiber bundle 2, a beam splitter 3, and an image receiving module 4. The laser ranging module 1 comprises a light source 11, an optical receiver 12, and a computing unit 13. The light source 11 is configured to provide a measuring beam L1. The optical receiver 12 receives a reflected beam from the target S to generate a measurement signal, wherein the measuring beam L1 is emitted from the light source 11 to the target S, and the target S reflects the measuring beam L1 to form the reflected beam. The computing unit 13 receives the measurement signal. In this embodiment, the measuring beam L1 is a visible laser beam with a wavelength of 400-780 nm.

The dual-branched fiber bundle 2 is connected to the laser ranging module 1. The beam splitter 3 is disposed at one side of the dual-branched fiber bundle 2 away from the laser ranging module 1. The beam splitter 3 splits the reflected beam L2 into a first reflected beam L21 and a second reflected beam L22, and a first angle θ is defined between the traveling directions of the first reflected beam L21 and the second reflected beam L22. The image receiving module 4 is disposed on an optical path of the second reflected beam L22 to receive an image of the target S. In more detailed, the beam splitter 3 is a 45-degree semitransparent beam-splitter mirror, and the surface of the beam splitter 3 and the traveling direction of the measuring beam L1 have an included angle of 45 degrees. Accordingly to this configuration, the first reflected beam L21 and the second reflected beam L22, which are split from the reflected beam L2, can be perpendicular to each other. In other words, the first angle θ is 90 degrees.

In this embodiment, the beam splitter 3 can split the reflected beam L2 into the first reflected beam L21 and the second reflected beam L22 in different proportions. Preferably, the ratio of the first reflected beam L21 to the second reflected beam L22 is between 7:3 and 3:7, which can be determined by the spec of the beam splitter 3. For example, 70% of the reflected beam L2 can penetrate through the beam splitter 3 to form the first reflected beam L21, and 30% of the reflected beam L2 can be reflected by the beam splitter 3 to form the second reflected beam L22. Alternatively, 30% of the reflected beam L2 can penetrate through the beam splitter 3 to form the first reflected beam L21, and 70% of the reflected beam L2 can be reflected by the beam splitter 3 to form the second reflected beam L22.

The traveling direction of the light path in the integrated device OD1 according to the first embodiment of this disclosure will be discussed hereinafter. In this embodiment, the light source 11 emits the measuring beam L1, and the measuring beam L1 is emitted to the target S through the dual-branched fiber bundle 2 and the beam splitter 3. Then, the target S reflects the measuring beam L1 to form the reflected beam L2. The reflected beam L2 is sent to the beam splitter 3, and the beam splitter 3 can split the reflected beam L2 into a first reflected beam L21 and a second reflected beam L22. The first reflected beam L21 is transmitted to the optical receiver 12 through the dual-branched fiber bundle 2, and the optical receiver 12 generates a measurement signal accordingly. The computing unit 13 receives the measurement signal to calculate a distance d between the target S and the side of the dual-branched fiber bundle 2 away from the laser ranging module 1. The image receiving module 4 receives the second reflected beam L22 and displays the image of the target S accordingly. In this embodiment, the image receiving module 4 can comprise a display screen (not shown) for displaying the image of the target S. Moreover, the display screen can simultaneously display the image of the target S and the distance d between the target S and the side of the dual-branched fiber bundle 2 away from the laser ranging module 1. The detailed description of the components in the dual-branched fiber bundle 2 will be discussed later.

In this embodiment, the laser ranging module 1 can further comprise a light output port 14 and a light input port 15. The light output port 14 is disposed corresponding to the light source 11, and the light input port 15 is disposed corresponding to the optical receiver 12. The measuring beam L1 is emitted from the light output port 14 to the target S, and the first reflected beam L21 is emitted from the light input port 15 to the optical receiver 12. In this embodiment, the laser ranging module 1 further comprises a laser ranging housing H1. The light output port 14 and the light input port 15 are disposed on the laser ranging housing H1, and the light source 11, the optical receiver 12 and the computing unit 13 are disposed inside the laser ranging housing H1. The light output port 14 is disposed corresponding to the light source 11, and the light input port 15 is disposed corresponding to the optical receiver 12.

In this embodiment, the dual-branched fiber bundle 2 comprises a first fiber bundle 21, a second fiber bundle 22, and a fiber detecting head 23. The first fiber bundle 21 has an end 21a connecting to the light output port 14, and the second fiber bundle 22 has an end 22a connecting to the light input port 15. The fiber detecting head 23 is formed by integrating the other end 21b of the first fiber bundle 21 and the other end 22b of the second fiber bundle 22. In more detailed, the light source 11 emits the measuring beam L1, and the measuring beam L1 passes through the light output port 14 and the first fiber bundle 21 and is then emitted from the fiber detecting head 23 to the target S through the beam splitter 3. The target S reflects the measuring beam L1 to form the reflected beam L2, and the reflected beam L2 is reflected from the target S to the beam splitter 3. The first reflected beam L21 is transmitted to the optical receiver 12 through the fiber detecting head 23, the second fiber bundle 22, and the light input port 15. The optical receiver 12 generates the measurement signal accordingly, and the computing unit 13 receives the measurement signal to calculate the distance d between the target S and an end surface of the fiber detecting head 23 (the side of the dual-branched fiber bundle 2 away from the laser ranging module 1). In this case, the other end 21b of the first fiber bundle 21 and the other end 22b of the second fiber bundle 22 can be integrated into a cylindrical structure by a mechanical structural method to form the fiber detecting head 23. The end 21a of the first fiber bundle 21 and the light output port 14 and/or the end 22a of the second fiber bundle 22 and the light input port 15 can be connected by any well-known conventional method such as welding, adhering, screwing, or the likes, and this disclosure is not limited.

In this embodiment, the end 21a of the first fiber bundle 21 is disposed corresponding to a light spot center L1a of the light source 11, so that the end 21a of the first fiber bundle 21 and the light spot center L1a of the light source 11 are located on the same axial line. Thus, the first fiber bundle 21 can more precisely receive the measuring beam L1 emitted from the light source 11. In addition, the integrated device OD1 can further comprise a receiving lens (not shown) disposed at the light input port 15 (between the optical receiver 12 and the second fiber bundle 22). The end 22a of the second fiber bundle 22 is disposed corresponding to the lens center of the receiving lens, so that the end 22a of the second fiber bundle 22 and the lens center of the receiving lens are located on the same axial line. Accordingly, when the first reflected beam L21 emitted from the second fiber bundle 22 can pass through the lens center of the receiving lens without generating deviation, so that the optical receiver 12 can more precisely receive the first reflected beam L21 emitted from the second fiber bundle 22.

In this embodiment, the integrated device OD1 can further comprise a light absorbing module 5. Herein, the beam splitter 3 also splits the measuring beam L1 into a first measuring beam L11 and a second measuring beam L12, and a second angle Ø is defined between the traveling directions of the first measuring beam L11 and the second measuring beam L12. The light absorbing module 5 is disposed on the traveling direction of the second measuring beam L12 for absorbing the second measuring beam L12. In more detailed, the first measuring beam L11 and the second measuring beam L12, which are split by the beam splitter 3, are perpendicular to each other. That is, the second angle Ø is 90 degrees. The light absorbing module 5 can absorb the second measuring beam L12 for preventing the reflection of the second measuring beam L12, which may interfere the calculation of the distance of the target S.

In this embodiment, the beam splitter 3 can split the measuring beam L1 into the first measuring beam L11 and the second measuring beam L12 in different proportions. Preferably, the ratio of the first measuring beam L11 to the second measuring beam L12 is between 7:3 and 3:7, which can be determined by the spec of the beam splitter 3. For example, 70% of the measuring beam L1 can penetrate through the beam splitter 3 to form the first measuring beam L11, and 30% of the measuring beam L1 can be reflected by the beam splitter 3 to form the second measuring beam L12. Alternatively, 30% of the measuring beam L1 can penetrate through the beam splitter 3 to form the first measuring beam L11, and 70% of the measuring beam L1 can be reflected by the beam splitter 3 to form the second measuring beam L12.

In this embodiment, the integrated device OD1 further comprises a housing H2, which has a first opening H21 and a second opening H22. The second opening H22 is disposed corresponding to the first opening H21. The housing H2 covers one end of the fiber detecting head 23 away from the laser ranging module 1 through the first opening H21. The beam splitter 3, the image receiving module 4, and the light absorbing module 5 are disposed inside the housing H2. The measuring beam L1 is emitted from the light source 11 to the target S through the fiber detecting head 23, the beam splitter 3, and the second opening H22. The reflected beam L2 is reflected from the target S to the beam splitter 3 through the second opening H22. In this embodiment, the housing H2 can connect the beam splitter 3, the image receiving module 4, and the light absorbing module 5 to the fiber detecting head 23 of the dual-branched fiber bundle 2. The light output port 14 and the light input port 15 of the laser ranging module 1 are connected to the end 21a of the first fiber bundle 21 and the end 22a of the second fiber bundle 22, respectively. Accordingly, the laser ranging module 1, the dual-branched fiber bundle 2, the beam splitter 3, the image receiving module 4, and the light absorbing module 5 can be integrated in the integrated device OD1. Since the dual-branched fiber bundle 2 is flexible and the light beams can travel in the curved dual-branched fiber bundle 2 without interference, the dual-branched fiber bundle 2 can be extended or curved for fitting various unfriendly detection environments during the ranging operation of the integrated device OD1, thereby decreasing the difficulty of ranging operation. In addition, the integrated device OD1 of this disclosure has a coaxial ranging function, so that the minimum distance between the target S and the integrated device OD1 for laser ranging and imaging of this disclosure is not limited. Thus, the integrated device OD1 of this disclosure can be applied to measure a shorter distance. Moreover, the image receiving module 4 of the integrated device OD1 can provide the image displaying function simultaneously.

In this embodiment, the light absorbing module 5 comprises a light absorbing material 51, and the light absorbing material 51 comprises black nanoparticles. The black nanoparticles have a fluffy structure for absorbing the second measuring beam L12, thereby preventing the reflection of the second measuring beam L12 to interfere the computing unit 13 in the calculation of the distance of the target S. Herein, the material of the black nanoparticles can be, for example but not limited to, metal nanoparticles, carbon nanoparticles, silica nanoparticles, or any of other known black nanoparticles having the fluffy structure for absorbing or refracting the light beam. As shown in FIG. 1, the light absorbing material 51 is formed as a plate, which is disposed on the traveling direction of the second measuring beam L12 and is configured for absorbing the second measuring beam L12.

Figure 2:
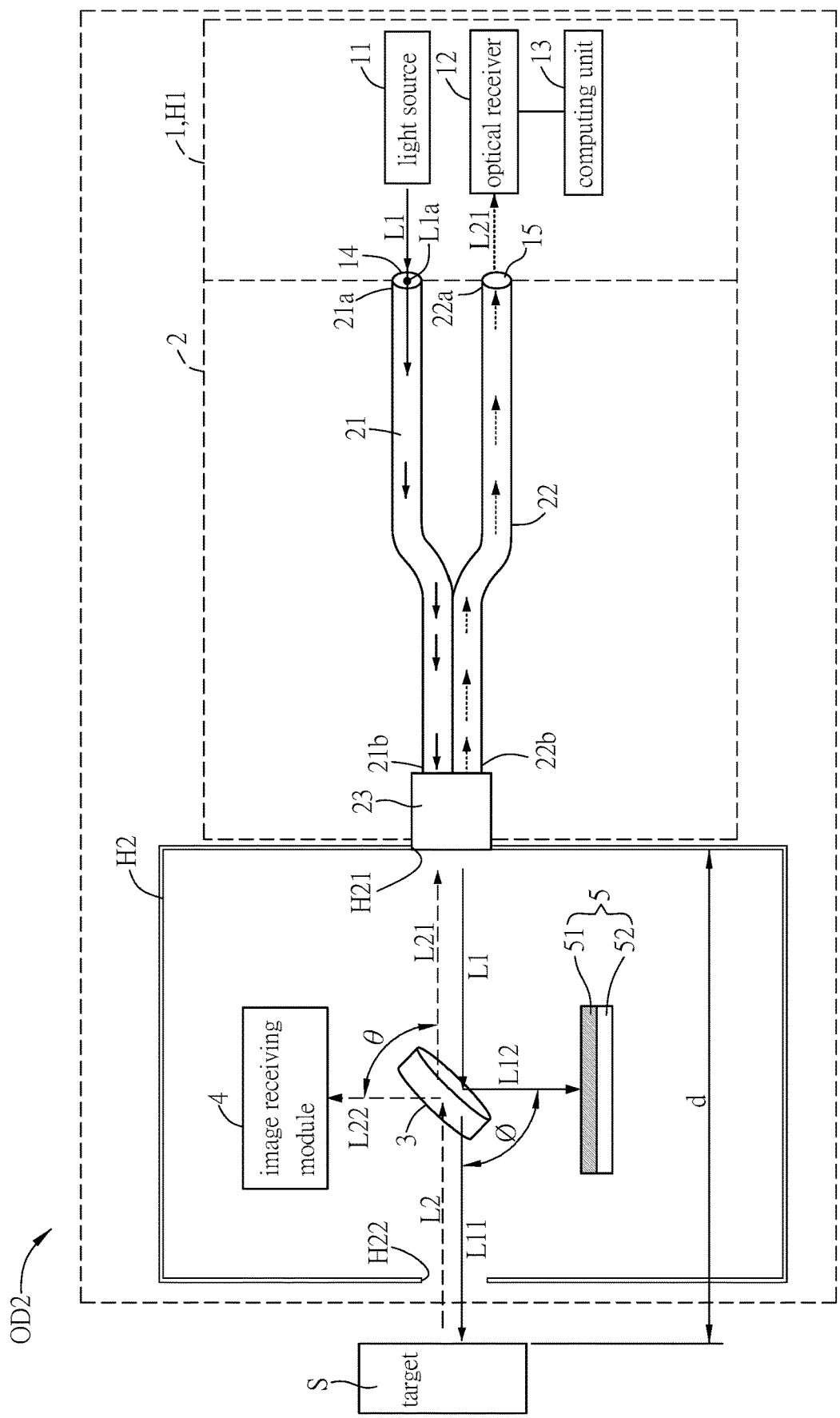
FIG. 2 is a schematic diagram showing an integrated device for laser ranging and imaging according to a second embodiment of this disclosure.

The basic structure and features of an integrated device OD2 for laser ranging and imaging according to a second embodiment of this disclosure will be described hereinafter with reference to FIG. 2. FIG. 2 is a schematic diagram showing an integrated device for laser ranging and imaging according to a second embodiment of this disclosure. The configurations and functions of the laser ranging module 1, the dual-branched fiber bundle 2, the beam splitter 3, and the image receiving module 4 of the integrated device OD2 of the second embodiment are the same as those of the integrated device OD1 of the first embodiment, so the detailed descriptions thereof will be omitted. The configuration of the light absorbing module 5 of the second embodiment is different from that of the first embodiment.

As shown in FIG. 2, in this embodiment, the light absorbing module 5 further comprises a carrier 52, and the light absorbing material 51 is disposed on a surface of the carrier 52. The surface of the carrier 52 coated with the light absorbing material 51 faces toward the incident direction of the second measuring beam L12 for absorbing the second measuring beam L12. This configuration can prevent the reflection of the second measuring beam L12, which may interfere the calculation of the distance of the target S (calculated by the computing unit 13).

The basic structure and features of an integrated device OD3 for laser ranging and imaging according to a third embodiment of this disclosure will be described hereinafter with reference to FIG. 3. FIG. 2 is a schematic diagram showing an integrated device for laser ranging and imaging according to a third embodiment of this disclosure. The configurations and functions of the laser ranging module 1, the dual-branched fiber bundle 2, the beam splitter 3, and the image receiving module 4 of the integrated device OD3 of the third embodiment are the same as those of the integrated device OD1 of the first embodiment, so the detailed descriptions thereof will be omitted. The configuration of the light absorbing module 5 of the third embodiment is different from that of the first embodiment.

Figure 3:
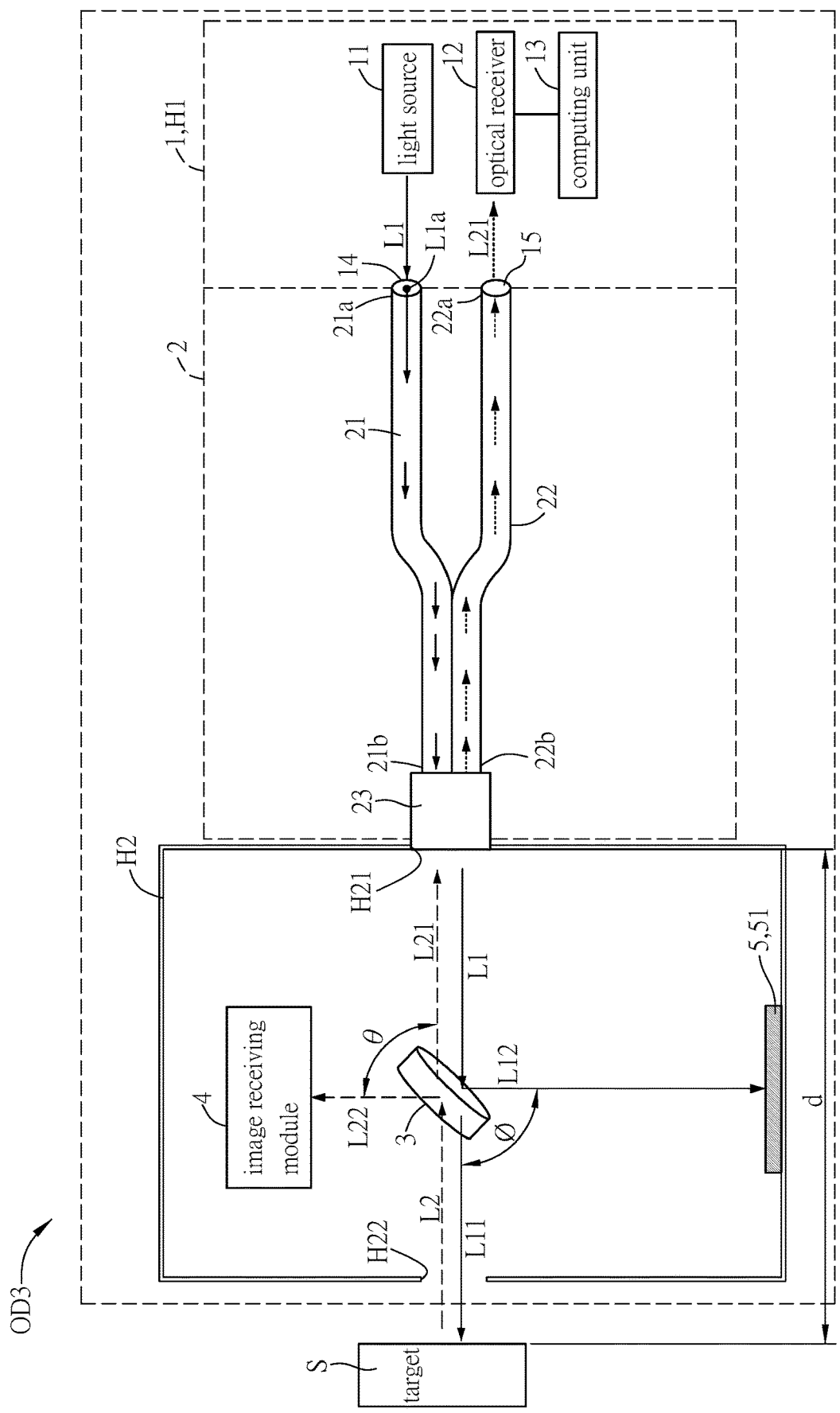
FIG. 3 is a schematic diagram showing an integrated device for laser ranging and imaging according to a third embodiment of this disclosure.

As shown in FIG. 3, in this embodiment, the light absorbing material 51 is directly coated on an inner surface of the housing H2, which is corresponding to the traveling direction of the second measuring beam L12 for absorbing the second measuring beam L12. This configuration can prevent the reflection of the second measuring beam L12, which may interfere the calculation of the distance of the target S (calculated by the computing unit 13).

In summary, the integrated device for laser ranging and imaging of this disclosure comprises and integrates a laser ranging module, a dual-branched fiber bundle, a beam splitter, an image receiving module, and a light absorbing module, so that the integrated device can provide both of the ranging and image displaying functions. In addition, since the light beams can travel in the curved dual-branched fiber bundle without interference, the dual-branched fiber bundle can be extended or curved for fitting various unfriendly detection environments during the ranging operation of the integrated device, thereby decreasing the difficulty of ranging operation. In addition, the integrated device of this disclosure has a coaxial ranging function, so that the minimum distance between the target and the integrated device for laser ranging and imaging of this disclosure is not limited. Thus, the integrated device of this disclosure can be applied to measure a shorter distance. Moreover, the configuration of the light absorbing module can prevent the misjudgment caused by the reflected beam from an object other than the target.

Although the disclosure has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the disclosure.

What is claimed is:

1. An integrated device for laser ranging and imaging, which is configured to measure a distance between the integrated device and a target and to display an image of the target, the integrated device comprising:
 a laser ranging module, comprising:
  a light source configured to provide a measuring beam,
  an optical receiver for receiving a reflected beam from the target to generate a measurement signal, wherein the measuring beam is emitted from the light source to the target, and the target reflects the measuring beam to form the reflected beam, and
  a computing unit for receiving the measurement signal;
 a dual-branched fiber bundle connected to the laser ranging module;
 a beam splitter disposed at one side of the dual-branched fiber bundle away from the laser ranging module, wherein the beam splitter splits the reflected beam into a first reflected beam and a second reflected beam, and a first angle is defined between traveling directions of the first reflected beam and the second reflected beam; and
 an image receiving module disposed on an optical path of the second reflected beam to receive an image of the target;
 wherein, the measuring beam is emitted from the light source to the target through the dual-branched fiber bundle and the beam splitter, the target reflects the measuring beam to form the reflected beam, the beam splitter splits the reflected beam into the first reflected beam and the second reflected beam, the first reflected beam is transmitted to the optical receiver through the dual-branched fiber bundle to generate the measurement signal, the computing unit receives the measurement signal to calculate a distance between the target and the side of the dual-branched fiber bundle away from the laser ranging module, the image receiving module receives the second reflected beam and displays the image of the target.

2. The integrated device of claim 1, further comprising: a light absorbing module, wherein the beam splitter splits the measuring beam into a first measuring beam and a second measuring beam, a second angle is defined between traveling directions of the first measuring beam and the second measuring beam, and the light absorbing module is disposed on the traveling direction of the second measuring beam for absorbing the second measuring beam.

3. The integrated device of claim 2, wherein the laser ranging module further comprises a light output port and a light input port, the light output port is disposed corresponding to the light source, the light input port is disposed corresponding to the optical receiver, the measuring beam is emitted from the light output port to the target, and the first reflected beam is emitted from the light input port to the optical receiver.

4. The integrated device of claim 3, wherein the dual-branched fiber bundle comprises:
a first fiber bundle having an end connecting to the light output port;
a second fiber bundle having an end connecting to the light input port; and
a fiber detecting head formed by integrating another end of the first fiber bundle and another end of the second fiber bundle;
wherein, the measuring beam emitted by the light source passes through the light output port and the first fiber bundle and is then emitted from the fiber detecting head to the target through the beam splitter, the reflected beam is reflected from the target to the beam splitter, the first reflected beam is transmitted to the optical receiver through the fiber detecting head, the second fiber bundle and the light input port, the optical receiver generates the measurement signal, and the computing unit receives the measurement signal to calculate the distance between the target and an end surface of the fiber detecting head.

5. The integrated device of claim 2, wherein the beam splitter is a 45-degree semitransparent beam-splitter mirror, and the first angle and the second angle are 90 degrees.

6. The integrated device of claim 1, wherein the beam splitter splits the reflected beam into the first reflected beam and the second reflected beam in different proportions.

7. The integrated device of claim 2, wherein the beam splitter splits the measuring beam into the first measuring beam and the second measuring beam in different proportions.

8. The integrated device of claim 2, wherein the light absorbing module comprises a light absorbing material, and the light absorbing material comprises black nanoparticles.

9. The integrated device of claim 8, wherein the light absorbing module further comprises a carrier, and the light absorbing material is disposed on a surface of the carrier.

10. The integrated device of claim 4, further comprising a housing having a first opening and a second opening, wherein the second opening is disposed corresponding to the first opening, the housing covers one end of the fiber detecting head away from the laser ranging module through the first opening, the beam splitter, the image receiving module and the light absorbing module are disposed inside the housing, the measuring beam is emitted from the light source to the target through the fiber detecting head, the beam splitter, and the second opening, and the reflected beam is reflected from the target to the beam splitter through the second opening.

* * * * *